May 19, 1953 D. B. REEVES 2,639,335
ULTRAHIGH FREQUENCY AMPLIFIER
Filed June 23, 1950 2 Sheets-Sheet 1

INVENTOR.
DOUGAL B. REEVES
BY John J. Rogan
ATTORNEY

ULTRAHIGH FREQUENCY AMPLIFIER

Filed June 23, 1950 2 Sheets-Sheet 2

INVENTOR.
DOUGAL B. REEVES
BY John J. Rogan
ATTORNEY

Patented May 19, 1953 2,639,335

UNITED STATES PATENT OFFICE 2,639,335

ULTRAHIGH-FREQUENCY AMPLIFIER

Dougal B. Reeves, Madison, N. J., assignor to National Union Radio Corporation, Orange, N. J., a corporation of Delaware Application June 23, 1950, Serial No. 169,799

3 Claims. (Cl. 179—171)

This invention relates to electron tube amplifiers or repeaters, and more especially to amplifiers that are required to operate at ultra high frequencies.

A principal object of the invention is to provide a novel combination of electron tubes and inter-stage coupling arrangements whereby efficient amplification can be obtained at ultra high frequencies, for example of the order of several hundred megacycles per second, or more.

Another object relates to an improved inter-stage coupling arrangement for ultra high frequency amplifier tubes, wherein the inherent stray and inter-electrode capacitances of the tubes and their lead-ins can be usefully employed as part of a resonant wave transmission line coupling unit.

Another object is to provide an inter-stage coupling arrangement between ultra high frequency amplifier tubes, which arrangement is in the form of an open-ended resonant one-half wavelength line constituted in part of the stray capacitances of the tubes.

A feature of the invention relates to a novel amplifier construction incorporating a plurality of electron tubes mounted with respect to a metallic shield for electrostatically segregating the input and output circuits of each tube and with an inter-stage coupling transmission line, one conductor of which is constituted of said metal shield.

Another feature relates to the novel organization, arrangement and relative location and interconnection of parts which cooperate to provide an improved broad band amplifier for use at ultra high frequencies.

Other features and advantages not specifically enumerated, will be apparent after a consideration of the following detailed descriptions and the appended claims.

One of the limitations on the efficiency of electron tube amplifiers operating at ultra high frequencies, for example 300 megacycles per second, is that the inherent tube capacitances, and the inherent inductances of the lead-ins and connector pins of the tubes are usually large enough to make inter-stage coupling arrangements unsatisfactory and even unworkable. Amplifier inter-stage coupling arrangements have been proposed heretofore using wave transmission lines as impedance-matching networks for obtaining critical coupling. Such systems perform fairly well as narrow band amplifiers. However they are far below optimum efficiency when large gain and band width characteristics are necessary, for example in video amplifiers, television amplifiers, and the like. It is known that maximum gain and band width are obtained when the coupling is greater than critical coupling. At frequencies of 300 megacycles and above, coupling greater than critical is usually impossible with conventional tubes such as pentodes, electron multiplier tubes, and the like, because the input and output capacitances of the coupled tubes are effectively across the resonant circuit. Thus the total capacity and the inherent inductance of the lead-ins, including the tube prongs, to the various tube electrodes, are too great to resonate in the desired ultra high frequency region. The present invention provides a practical solution to this difficulty.

Figure 1:
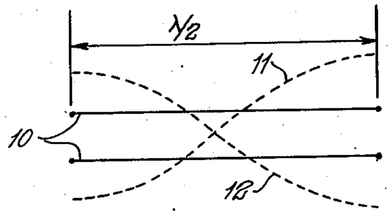
Figs. 1 and 2 are schematic diagrams of a transmission line coupling arrangement which are explanatory of the invention.
Figure 2:
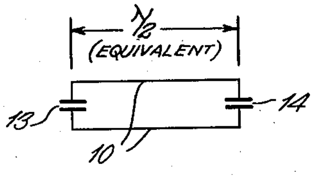

Referring to Fig. 1 of the drawing, there is shown a conventional wave transmission line 10, whose electrical length is equal to a half wavelength of the operating frequency. The voltage distribution along the line is represented by the dot-dash graphs 11, 12. The graphs 11, 12, represent respectively the voltage distribution for two excitation conditions at the input of the line, which are 180° out of phase. At the center of the line, there is a voltage node. In order to shorten the physical length of the line and still maintain its one-half wavelength characteristics, it can be loaded at opposite ends as schematically represented by the capacitors 13, 14 (Fig. 2).

Looking along the line in the direction from 13 to 14, the input end sees an apparent high impedance at resonance which is analogous to a parallel tuned circuit. This fact is taken advantage of, according to one phase of the invention, by replacing the capacitance 13 by the output capacitance of one electron tube amplifier, and by replacing the capacitance 14 by the input capacitance of the succeeding amplifier tube. If these two capacitances were equal, the same voltage would be present across the input of the second tube as is applied or generated at the output of the preceding tube, and there would be unity coupling. If the input capacitance of the second tube is greater than the output capacitance of the preceding tube, an impedance transformation is obtained.

In conventional electron tube amplifier circuits, it is necessary to provide by-passes to ground for certain of the tube electrodes or tube elements, which are required to operate at a steady direct current bias; and it is also necessary to prevent undesirable electrostatic coupling between the input and output circuits of the same tube. According to another phase of the present invention, the output of one tube is coupled to the input of the succeeding tube solely by a wave transmission line of the half wavelength type. One of the conductors of this line is constituted of a linear elongated electrostatic condenser, and the other conductor of this line is constituted of the ground plane or metal shield which serves to isolate the input and output elements of each tube. In other words, this metal shield performs the double function of an electrostatic isolating element, and at the same time it acts as one of the conductors of a coupling line between successive tubes.

Figures 3, 4:
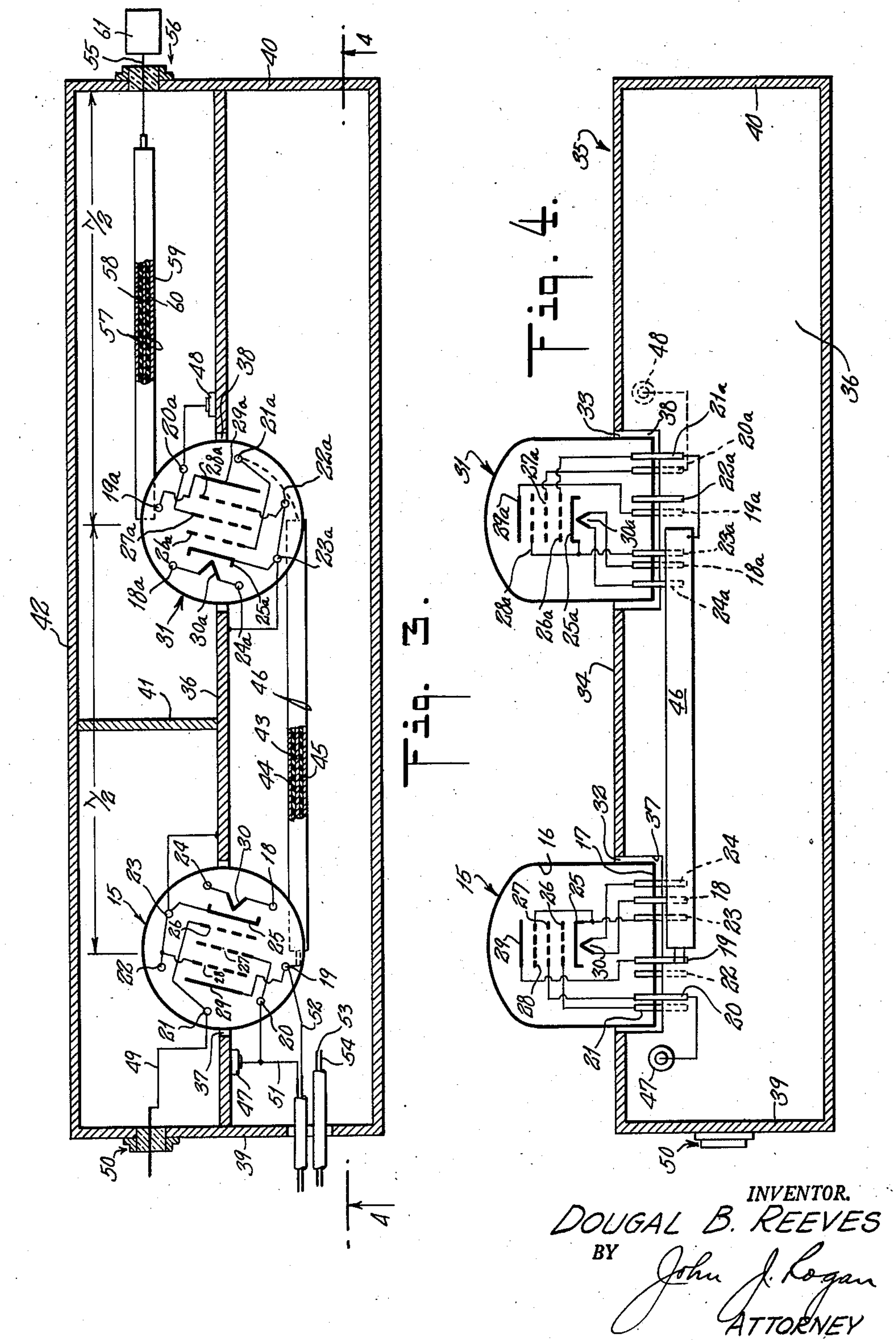
Fig. 3 is a top plan view, partly sectional, of a two-stage ultra high frequency amplifier according to the invention.
Fig. 4 is a sectional view of Fig. 3, taken along the line 4—4 thereof.

Referring to Figs. 3 and 4, there is shown one preferred physical embodiment of the invention incorporated in a two-stage ultra high frequency amplifier. Each of these stages may comprise a conventional grid-controlled electron tube preferably, although not necessarily, of the pentode type. For example, the tube 15 may comprise the usual evacuated enclosing bulb or envelope 16, having a base 17 which carries the plug-in prongs or pins 18—24. Enclosed within the bulb, and suitably mounted therein, are the usual electrodes, comprising the electron-emitting cathode 25, control grid 26, shield grid 27, suppressor grid 28, and plate or anode 29. Merely for simplicity in the drawing, these electrodes are shown schematically. In addition, the usual heater element or filament 30 is provided for raising the cathode to electron-emitting condition. The internal mount construction of such tubes usually provides special shielding means to segregate the control grid or input elements from the plate or output elements within the tube. However at ultra high frequencies it is necessary to extend this shielding exteriorly of the tube, particularly to isolate electrostatically the plate prong or pin 19 from the control grid prong or pin 21. The tube 31 may be the same in construction as tube 15, comprising the filament prongs 18*a*—24*a* connected to the respective electrodes 25*a*—29*a* and to the respective filament 30*a*. The two tubes are suitably mounted, and extend through respective openings 32, 33, in the top wall 34 of a metal container or box 35. Extending throughout the length of the box is a metal partition 36 which has notches 37, 38, cut therefrom in registry with the respective openings 32, 33. The partition 36 is soldered or otherwise conductively fastened to the end walls 39 and 40, thus dividing the box 35 into two separate compartments. The tube 15, as shown in Fig. 4, passes through the opening 32 and is supported so that substantially the entire external length of the control grid prong 21 is located on one side of the shielding partition 36, while substantially the entire external length of the plate prong 19 is located on the opposite side of this partition. It is the usual practice in tubes of this type, to locate the contact pins or prongs around a common center and usually in circular array, and in any event it is the usual practice to locate the grid and plate prongs fairly widely apart. Thus in the particular construction shown, these plate and grid prongs 19, 21, and 19*a*, 21*a*, are on opposite sides of the respective shield grid prongs 20 and 20*a*.

In order to achieve the desired objects of the invention, the tube 31 however is mounted in the opening 33 so that the respective plate and control grid prongs 19*a* and 21*a* are also located on opposite sides of the partition 36. However the tube 31 is turned around its vertical axis through an angle, so that the plate prong 19*a* is located on the same side of partition 36 as is the control grid prong 21 of tube 15. Likewise the control grid prong 21*a* is located on the same side of partition 36 as is the plate prong 19. Preferably a supplementary metal partition 41 extends between the partition 36 and the side wall 42 of the box.

In accordance with the invention also, the tubes 15 and 31 are spaced apart along the partition 36 so that their vertical centers are located approximately one-half wavelength apart. This distance will be determined by the inherent loading output capacitance of tube 15 and the inherent loading input capacitance of tube 31, for purposes to be described. In order to couple the plate 29 to the control grid 26*a*, there is provided an elongated linear electrostatic condenser, comprising an inner elongated metal strip 43 and an outer elongated metal strip 44, with the strips insulated by an intervening layer 45 of suitable dielectric. The strip 43 is directly connected to the plate prong 19, while the strip 44 is directly connected to the control grid prong 21*a*. The elements 43, 44, 45, thus constitute what may be termed a stacked electrostatic line conductor 46. In accordance with the invention, this line conductor is spaced from the partition 36, and its length is chosen so that it forms with the said partition a wave transmission line whose electrical length when taken in conjunction with the output capacitance of tube 15 and the input capacitance of tube 31, constitutes a half wavelength line. There is thus provided a substantially continuous transmission line between the output elements of tube 15 and the input elements of tube 31, and as explained above in connection with Figs. 1 and 2, there will be a voltage node along this line. If the input capacitance of tube 31 is high, this voltage node would occur close to the envelope of tube 31 or even inside of the said tube envelope, and as explained above, the upper frequency limit of amplification is extended beyond the usable upper limit obtainable with conventional inter-stage coupling circuits.

The cathode prongs 23 and 23*a* are directly connected by short metal jumpers to the ground plane formed of the partition 36. Likewise the suppressor grid prongs 22 and 22*a* are also returned directly to this ground plane. The shield grid prong 20 is by-passed to ground by means of a button-type condenser 47 connected directly between prong 20 and partition 36. Likewise the shield grid prong 20*a* is by-passed to ground directly by a similar button-type condenser 48. The control grid 26 can be connected to desired source of ultra high frequency input signals by means of a short shielded conductor 49 having the usual coaxial line connector 50 mounted on the end wall 39. Suitable insulated lead-ins 51, 52, may supply the direct current potentials for the plate and shield grids respectively. Likewise, separate supply conductors 53, 54, may be connected to the prongs 18 and 24 to heat the filament 30.

The plate prong 19a is directly connected to the center conductor 55 of a conventional coaxial coupling connector 56, by means of an elongated linear capacitive line 57, which may be similar in construction to line 46. This line may comprise a pair of elongated flat metal strips 58, 59, which are separated by an intervening dielectric 60. Here again, line 57 is located in predetermined parallel spaced relation to the shield 36 so that in conjunction with the output capacitance of tube 31, and the input capacitance of the load device 61, it is electrically equal in length to a half wavelength of the operating frequency of the amplifier, which may, for example, be 300 megacycles per second.

Figure 5:
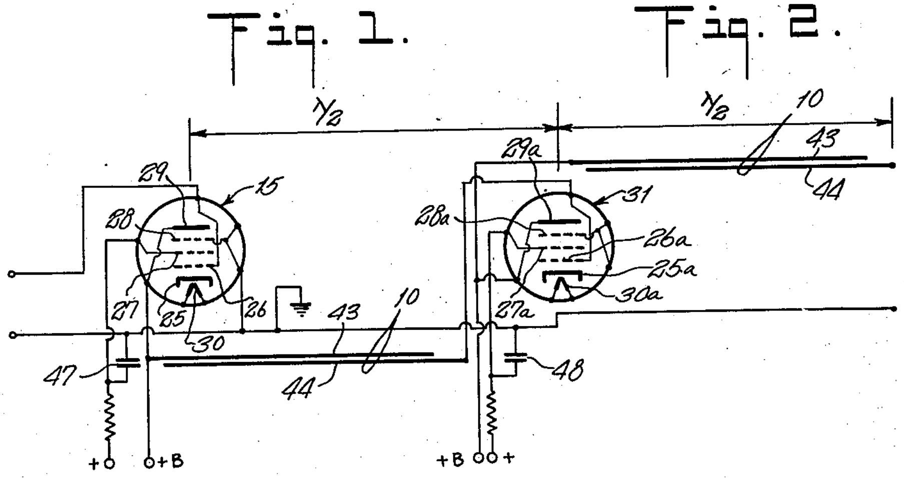
Fig. 5 is an equivalent schematic diagram for the amplifier of Figs. 3 and 4.
Figure 6:
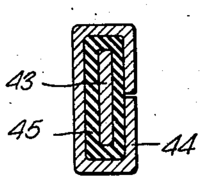
Fig. 6 is a cross-sectional view of one of the elements of Fig. 4, taken along the line 6—6 thereof.

Fig. 5 shows the equivalent schematic circuit connections for the amplifier of Figs. 3 and 4 with the corresponding parts of the figures designated alike.

It will be understood that the tubes 15 and 31 can be retained in the openings 32, 33, against vibration in any well-known manner, although the respective tubes may be rigidly supported by the connectors to the various elements which connectors are in turn attached to the partition 36. Thus the metal straps which connect the cathode prong 23 to the partition 36 and the metal strap which connects the shield grid prong 20, may be sufficiently rigid so that they support the tube 15 in the relation shown. It will be understood of course, that any other well-known means may be used for supporting the tube in position, for example each of the openings 32 and 33 may have a rubber ring or grommet attached to its edge for frictionally and resiliently engaging the envelope of the corresponding tube.

While the drawing shows an amplifier of two cascaded stages, it will be understood that the same principles may be involved for coupling three or more stages as will be apparent from the foregoing.

Various changes and modifications may be made in the disclosed embodiment without departing from the spirit and scope of the invention.

What is claimed is:

1. Ultra high frequency amplifier apparatus, comprising a metal housing having a metal partition therein defining a ground plane, a plurality of grid-controlled electron tubes partially extending through a wall of said housing each of said tubes having respective grid and plate lead-ins with the plate lead-in of one tube and the grid lead-in of the next tube disposed on the same side of said partition and with the control grid lead-in of the first tube and the plate lead-in of the next tube disposed on the opposite side of said partition, said partition extending in overlapping electrostatic relation between the grid and plate prongs of each tube, and a half wavelength transmission line serving as the signal coupling means between the plate of the first tube and the grid of the second tube, one conductor of said line being constituted of said partition and the other conductor of said line being constituted of a pair of elongated linear metal strips separated by a dielectric to form an electrostatic condenser extending along the major part of the line length.

2. Ultra high frequency amplifier apparatus according to claim 1, in which one metal strip of said other transmission line conductor is connected at one end substantially directly to the plate prong of the first tube and the other metal strip of said other line conductor being connected substantially directly at the opposite end of the control grid prong of the second tube.

3. Ultra high frequency amplifier apparatus, comprising a metal plate serving as a ground plane for the amplifier, a plurality of electron tubes each having a similar array of contact prongs concentrically arranged around the center of the tube base, and means to support said tubes with the plate prong of one tube and the control grid prong of the other tube located on the same side of said metal plate and with the control grid prong of said one tube and the plate prong of said other tube located on the opposite side of said metal plate, said tubes being spaced apart a distance equal to approximately one-half the wavelength of the operating amplifier frequency, and means coupling the output of the first tube to the input of the second tube and consisting substantially entirely of a half wavelength transmission line constituted in part of said metal shield.

DOUGAL B. REEVES.

References Cited in the file of this patent

UNITED STATES PATENTS

| Number | Name | Date |
|---|---|---|
| 2,143,671 | Zottu | Jan. 10, 1939 |
| 2,174,963 | Braaten | Oct. 3, 1939 |
| 2,223,835 | Smith | Dec. 3, 1940 |
| 2,397,543 | Fuchs | Apr. 2, 1946 |
| 2,427,110 | Selby | Sept. 9, 1947 |
| 2,463,724 | Starner | Mar. 8, 1949 |

FOREIGN PATENTS

| Number | Country | Date |
|---|---|---|
| 887,069 | France | July 26, 1943 |